United States Patent
Donoho

(10) Patent No.: US 9,521,838 B2
(45) Date of Patent: *Dec. 20, 2016

(54) SOLAR POWERED BIRD REPELLING DEVICE

(71) Applicant: Bird-B-Gone, Inc., Mission Viejo, CA (US)

(72) Inventor: Bruce Donoho, Mission Viejo, CA (US)

(73) Assignee: Bird-B-Gone, Inc., Mission Viejo, CA (US)

(*) Notice: Subject to any disclaimer, the term of this patent is extended or adjusted under 35 U.S.C. 154(b) by 488 days.

This patent is subject to a terminal disclaimer.

(21) Appl. No.: 13/926,011

(22) Filed: Jun. 25, 2013

(65) Prior Publication Data

US 2014/0241128 A1  Aug. 28, 2014

Related U.S. Application Data

(60) Provisional application No. 61/767,963, filed on Feb. 22, 2013.

(51) Int. Cl.
*G08B 23/00* (2006.01)
*A01M 29/16* (2011.01)
*A01M 29/18* (2011.01)

(52) U.S. Cl.
CPC ............. *A01M 29/16* (2013.01); *A01M 29/18* (2013.01)

(58) Field of Classification Search
CPC ............................ A01M 29/18; A01M 29/16
USPC ........ 340/384.2, 573.1–573.3; 367/136, 139; 119/713, 908
See application file for complete search history.

(56) References Cited

U.S. PATENT DOCUMENTS

| | | | | |
|---|---|---|---|---|
| 4,475,102 A * | 10/1984 | Troy | ..................... | A01M 29/20 340/573.2 |
| 5,463,595 A * | 10/1995 | Rodhall | ................. | A01M 29/18 340/541 |
| 5,793,706 A * | 8/1998 | Waletzky | .............. | A01M 29/16 367/139 |
| 5,864,516 A * | 1/1999 | Brown | .................. | A01K 15/02 367/139 |
| 5,892,446 A * | 4/1999 | Reich | ......................... | 340/573.1 |
| 5,966,075 A | 10/1999 | Blanks | | |
| 6,570,494 B1 | 5/2003 | Leftridge, Sr. | | |
| 7,173,534 B1 * | 2/2007 | Markham et al. | ......... | 340/573.2 |
| 7,227,452 B1 * | 6/2007 | Frost | .......................... | 340/384.2 |
| 7,324,409 B1 * | 1/2008 | Zweesaardt | .................. | 367/139 |

(Continued)

FOREIGN PATENT DOCUMENTS

GB  2161974  1/1986

OTHER PUBLICATIONS

Erickson, W.A. et al., "High Frequency Sound Devices Lack Efficacy in Repelling Birds", Vertebrate Pest Conference Proceedings, Proceedings of the Fifteenth Vertebrate Pest Conference, 1992.

(Continued)

*Primary Examiner* — Thomas Mullen
(74) *Attorney, Agent, or Firm* — Fish & Tsang LLP

(57) ABSTRACT

A photovoltaic cell or array is used to power a bird repelling device that emits deterrent sounds from a speaker or other sound emitter, under control of an electronic processor. Repellant sounds can be either a single sound, or a set of sounds, including for example pest species sounds and predator species sounds. One or more sensors, and a user interface, can assist in controlling which sound(s) to use, and when.

16 Claims, 4 Drawing Sheets

(56) References Cited

U.S. PATENT DOCUMENTS

| | | | |
|---|---|---|---|
| 8,786,404 B1* | 7/2014 | Tillman | 340/6.1 |
| 2002/0195062 A1* | 12/2002 | Marshall | A01K 39/0113 |
| | | | 119/428 |
| 2003/0058740 A1* | 3/2003 | Jincks | 367/139 |
| 2004/0093788 A1* | 5/2004 | Toyota | A01M 19/00 |
| | | | 43/124 |
| 2006/0225668 A1* | 10/2006 | Ross et al. | 119/719 |
| 2009/0179759 A1* | 7/2009 | Koury et al. | 340/557 |
| 2010/0027247 A1* | 2/2010 | Olsen | F21S 9/035 |
| | | | 362/183 |
| 2012/0113754 A1 | 5/2012 | Husseny et al. | |
| 2012/0286956 A1* | 11/2012 | Lee | 340/573.2 |
| 2013/0098309 A1* | 4/2013 | Nohara | A01M 29/06 |
| | | | 119/713 |

OTHER PUBLICATIONS

Martin, L.R., "Effective Use of Sound to Repel Birds from Industrial Waste Ponds", Internet Center for Wildlife Damage Management, Bird Control Seminars Proceedings, 1979.

* cited by examiner

SOLAR POWERED BIRD REPELLING DEVICE

This application claims priority to U.S. provisional application Ser. No. 61/767,963, filed Feb. 22, 2013. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is bird and pest deterrent devices.

BACKGROUND

The background description includes information that may be useful in understanding the present invention. It is not an admission that any of the information provided herein is prior art or relevant to the presently claimed invention, or that any publication specifically or implicitly referenced is prior art.

Birds sometimes cause harm to humans, gardens, patios, golf courses, warehouses, loading docks, poles, wires, trees, buildings, and various other animals and structures. Various devices exist that attempt to deter or repel certain insects or pests using ultrasonic sound waves, but existing devices suffer various limitations.

U.S. Pat. No. 6,570,494 to Leftridge, Sr. discloses a mosquito guard that can be hung or mounted outdoors. U.S. Pat. No. 7,227,452 to Frost discloses an animal deterring device that emits ultrasound. U.S. Pat. No. 5,966,075 to Blanks discloses a motion-sensitive bird repelling device that makes noise when prompted by motion detectors. U.S. Patent Application Publication No. 2012/0113754 to Husseiny discloses an avian denial infrasound system that broadcasts continuous infrasonic signals to create a bird-free infrasound active zone. Similarly, Great Britain Patent Application No. 2,161,974 to Jones (filed Jul. 18, 1984) and U.S. Patent Application No. 2012/0286956 to Lee (filed Dec. 30, 2010), describe devices that utilize naturally occurring sounds, such as those made by predators, to deter birds and other pests from designated areas. U.S. Pat. No. 7,324,409 to Zweesaardt (filed Sep. 21, 2006) describes a system that utilizes a sonic device that emits distress calls and a visual deterrent, both of which are fixed to a trailer-mounted mast—the trailer allowing the system to be towed using a vehicle.

These and all other extrinsic references herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The devices and methods mentioned above have limitations that reduce their efficacy in repelling birds. For example, Erickson, Marsh, and Salmon ("High Frequency Sound Devices Lack Efficacy in Repelling Birds", Proceedings of the Fifteenth Vertebrate Pest Conference 1992, Mar. 1, 1992, pp. 103-104) note that ultrasonic frequencies have little to no impact on avian pests. Martin ("Effective Use of Sound to Repel Birds from Industrial Waste Ponds", Bird Control Seminars Proceedings, Nov. 11, 1979, pp. 71-76) found that natural sounds, such as distress and predator sounds, are more effective than simple loud or shock noises at deterring birds. Unfortunately, it was also determined that birds quickly became habituated to the presence of devices utilizing such sounds and returned to protected areas protected after a brief period.

Thus, there is still a need for improved bird deterrents, including especially versatility in operation.

SUMMARY OF THE INVENTION

The inventive subject matter provides apparatus, systems and methods in which a bird deterrent device is configured to emit deterrent sounds under control of an electronic processor, and wherein the processor and sound emitter are powered by a photovoltaic array configured to obviate the need for hard-wired power.

The repellant sounds can be either a single sound, or a set of sounds, including for example pest species sounds and predator species sounds. It is contemplated that the set of emitted sounds can be stored as files in a database, which can optionally be updated from a cloud server, computer server, a cellular phone, a laptop computer, a tablet computer, a smart phone, or any other suitable device.

Bird deterrent devices can optionally include one or more sensors operatively coupled with the processor to assist in controlling which sound(s) to use, and when. Sensors are contemplated that detects any useful environmental property, as for example, temperature, light, sound, and motion. Also, multiple different sensors can be employed at the same time, or at different times.

A user interface can be operatively coupled with the processor to assist in controlling when at least one of the deterrent sounds is used. Contemplated operations include using the interface to allow a user to determine which sounds to emit, and when (e.g. using timer parameters, daylight/night time distinctions, etc.) for emitting sounds.

The photovoltaic array is preferably sufficient to make the device functionally portable, as for example, providing sufficient power to operate the device on a sunny day for a period of at least 5 consecutive hours, with an optional battery pack. More preferably, the photovoltaic array is preferably sufficient to provide such usage over each of at least 30 consecutive days. Accordingly, preferred embodiments are configured to be operated without any external hard-wired power source. Photovoltaic arrays can be of any suitable dimensions and components, including for example a 1×1 array consisting of a single photovoltaic cell, or more preferably larger arrays, e.g., those consisting of 2×3, 3×6, 6×6 or 10×10 cells. The cells can be small, e.g., 1 cm×1 cm, or preferably larger, such as 3 cm by 3 cm. Different cells can have different dimensions, which can include cells that have surface shapes other than square. The photovoltaic arrays in the figures should be interpreted generically to represent all such configurations.

Devices contemplated herein can find usefulness in repelling birds, rodents and other animals, and can also operate as a security system against humans. For example, devices can be deployed around a home, in a backyard, or in an open field, forested or cultivated area. Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 4 is a schematic of a bird deterrent system.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

Figure 1:
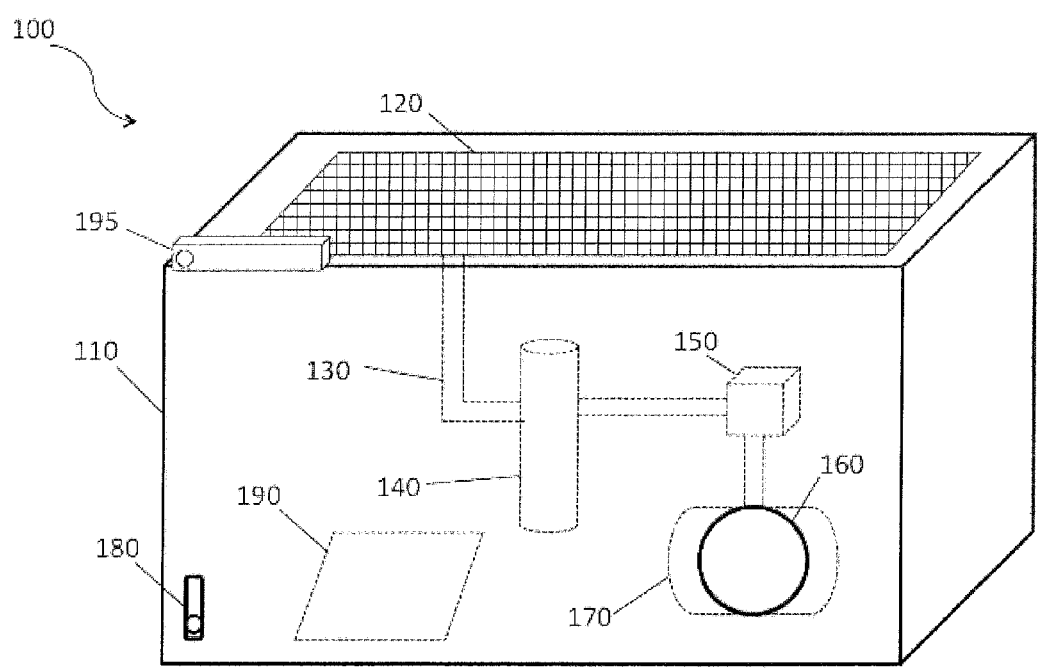
FIG. 1 is a schematic of one embodiment of a bird deterrent device.

In FIG. 1, bird deterrent comprises a waterproof, corrosion resistant, and portable housing 110 that at least partially houses a sound emitter 160 (e.g., speaker, etc.), a processor 150, and at least one power supply (e.g., solar/photovoltaic cell 120, battery 140, a rechargeable battery, an alkaline battery, a lithium battery, etc.), coupled to one another via wires 130. Device 100 can be used in any suitable environment(s), including for example, gardens, forests, parks, roofs, buildings, camping sites, parks, wind farms, farms, and airports.

Device 100 has a battery 140 that is preferably rechargeable via solar/photovoltaic cell 120. However, it is contemplated that a device of the inventive subject matter can comprise any suitable power supply, including for example, a wall socket, a power cord, non-rechargeable batteries, etc.

Some devices can comprise an ultrasonic sound generator 170 and sound emitter 160, which can produce and emit sounds at frequencies above 20 kilohertz. One example of an ultrasonic sound generator and sound emitter is a tweeter (or other suitable speaker driver) and speaker. It is contemplated that the ultrasound generator 170 can be included in the sound emitter 160, or can be a separate device coupled with the sound emitter 160.

It is also contemplated that the device 100 can comprise a sound generator and sound emitter configured to produce infrasound (e.g., lower than 20 hertz) and sound within human hearing range (e.g., 20 hertz to 20 kilohertz).

In some preferred embodiments, processor 150 is communicatively coupled to database 190, which is configured to store a plurality of sound files. Database 190 can store the sound files in any suitable format, including for example, MP3 files, Waveform Audio File Formal (WAV) files, AIFF, AU, FLAC, Apple Lossless, WMA Lossless, and WMA Lossy. Preferred sound files comprise sound waves (including ultrasound sound waves) representative of various bird predator calls.

Some contemplated devices are programmable. For example, device 100 can be programmed or reprogrammed by a user or a manufacturer to perform a specific task, e.g., play different sound files at different times of the day, emit a light or a sound depending on a time of day or environmental condition, change sound volume throughout the day, automatically power on or off at a given time or event, play a sound file on a periodic basis, and so forth. Device 100 can be programmed via remote control, touch-screen, buttons, remotely via an intranet or internet, or any other suitable method. Some devices can alternatively or additionally have manual features, such as a power switch 180, receiver 195 and remote control device (not shown), or buttons 240 (see FIG. 2).

The device can comprise or be coupled with a cloud database, such as a Dropbox™, Syncplicity™, FolderShare™, SyncToy™ 2.0, SyncBack™, or any other suitable cloud database. In such embodiments, it is contemplated that the device can automatically sync with the cloud database. This advantageously can ensure the device 100 includes the appropriate sounds. Contemplated databases can be local or remote from the device and can be configured to sync with a second, different database. The second database is sometimes stored in a user device such as a mobile telephone, a laptop computer, a tablet computer, but can also be stored on any physical server or cloud server that can be accessed by one or more device users.

In another aspect of the inventive subject matter, a bird deterrent device 100 comprises a receiver 195. Receiver 195 can be coupled to sound emitter 160 and configured to receive a signal from a remote control or other control device. Contemplated signals include infrared signals, radio frequency signals, or any other suitable signals. All commercially suitable remote control devices and receivers are contemplated.

Device 100 can also comprise a geo-location tool (e.g., an application, GPS chip, etc.) that obtains location information related to the device 100. The device 100 can be programmed to play different sound files depending on the location of the device.

Figure 2:
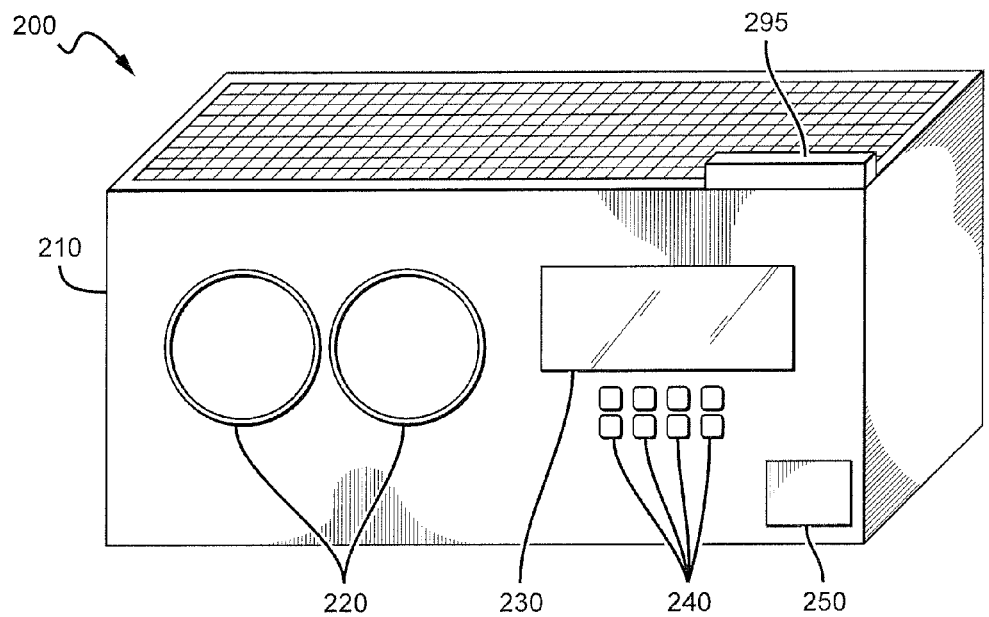
FIG. 2 is a schematic of another embodiment of a bird deterrent device.

In FIG. 2, device 200 comprises a user interface provided via display screen 230. It is contemplated that display screen 230 can be a touch-screen, or be coupled with buttons 240 to allow a user to interact with device 200. Device 200 further comprises a sensor 295, which can compose or be coupled to the housing 210.

A sensor, such as sensor 295, can be configured to detect a temperature, a movement, a light, a sound, a change in temperature, a change in brightness, a change in sound, or any other suitable environmental condition. Once sensor 295 detects an environmental condition, sensor 295 can produce a sensor signal. This sensor signal can be received by a processor, which can cause an action to occur, depending on the signal received. Exemplary actions include for example, a change in sound emitted by the sound emitter(s) 220, a powering on or off, an increase or decrease in volume, a turning on or off of a light, or a change in the frequency of the sound played.

For example, a motion sensor could be configured to detect a rapid movement (e.g., wing flapping, etc.), and produce a signal that is received by a processor. The processor can then cause a device to power on and play a sound file every two minutes. As another example, a light sensor can be configured to detect a brightness (e.g., daylight, moon light, night-time, etc.), and send a signal to a processor. The processor can then increase the volume of a sound file that is already configured to play every ten minutes.

Any existing sensor (e.g., a motion sensor, etc.) can be used in a bird deterrent device of the inventive subject matter. A sensor can be coupled to a feedback device, such as a sound emitter or a display screen. The feedback device is preferably configured to notify a user of a detection of a condition. When the user receives a notification, the user can manually change a setting of the device via a remote control, or entry of an input to a touchscreen or button.

In some embodiments, a bird deterrent device can include a timer 250 configured to automatically power down device 200 and thereby extend battery life. Timer 250 can be configured to turn off device 200 or portion thereof after 1, 5, 10, 15, or even 20 or more hours. Such a component can allow a user to schedule times for the device or portion thereof to shut down or power on automatically. Timer 250 can also be used to play sounds periodically (random or predetermined), or between certain times of the day.

It is also contemplated that a device can be configured to change the volume or frequency of sounds emitted based at least in part on the amount of battery left. This can advantageously ensure that the device stays on and emits sounds for a specified time period.

Figure 3:
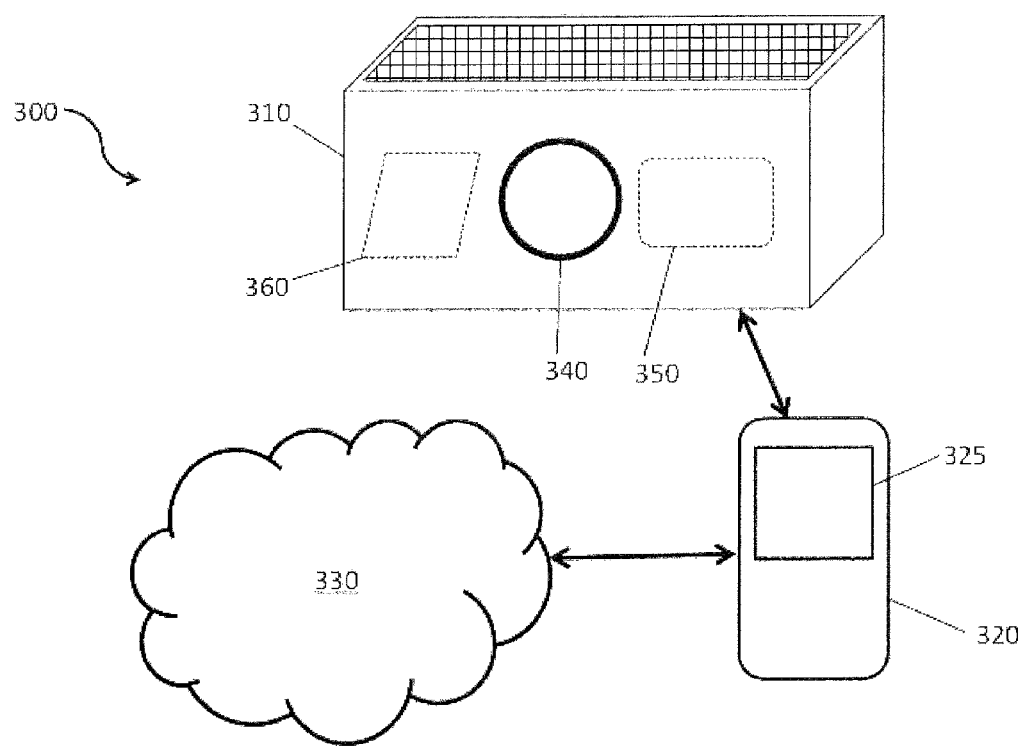
FIG. 3 is a schematic of a bird deterrent system.

In FIG. 3, a bird deterring system 300 is shown. System 300 comprises a bird deterrent device 310 that is communicatively coupled (e.g., wireless internet, intranet, Bluetooth, WiFi, etc.) with user device 320. Bird deterrent device 310 comprises a sound emitter 340, and a processor 350 that is communicatively coupled with a database 360.

User device 320 can comprise a display 325 that is configured to provide a user interface. In some embodiments, a user device can be included in or housed in a bird deterrent device. User device 320 is communicatively coupled with a cloud server 330, which comprises a database having stored sound files. It is contemplated that device 310 or 320 can comprise a database sync tool that allows database 360 to sync (automatically or manually) with a database coupled to user device 320. Alternatively, sound files can be pushed from server 330 to database 360 as the sound files are added to server 330.

Device 310 can be simply placed in an area, or mounted or otherwise secured to an area in any suitable manner, including for example, screw(s), mounting pole(s), glue, hook and loop fastener(s), or hanging loop(s) (e.g., rope, nyloncord, etc.).

Figure 4A:
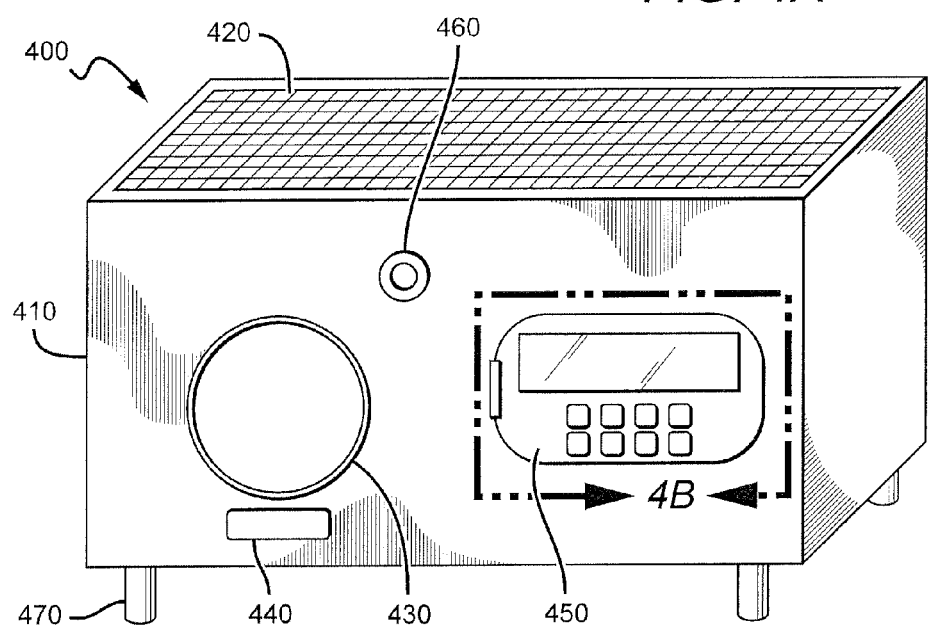
FIG. 4A depicts a view of an embodiment the bird deterrent system.
Figure 4B:
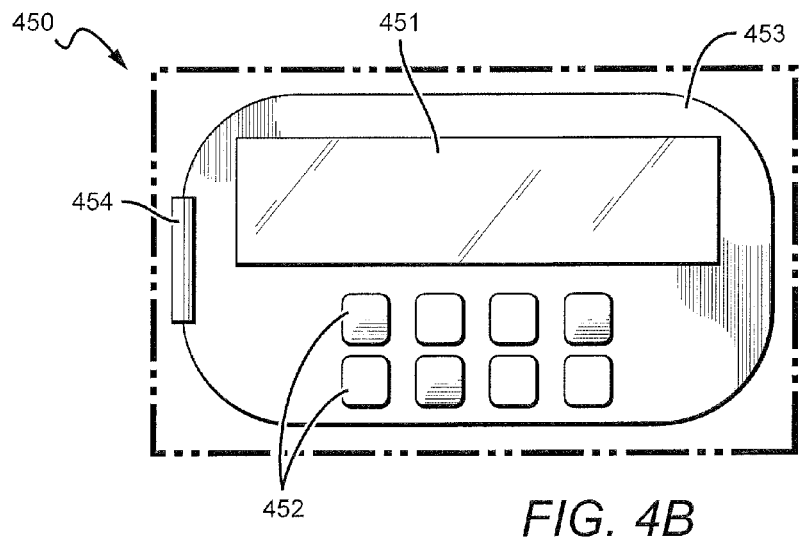
FIG. 4B shows a detailed view of a user interface.

Examples of other embodiments of the inventive concept are shown in FIG. 4A and FIG. 4B, which are described in greater detail below. FIG. 4A depicts a bird repelling device 400 that has a housing 410 which encloses, houses, or otherwise supports a photovoltaic panel or array 420 that can be used to provide power for the device, a sound emitter 430, a processor 440, and/or a user interface 450 (shown in greater detail in FIG. 4B). The housing 410 can include one or more supports 470, for example legs or other vertical supports, that can be attached either directly or indirectly to a lower portion of the housing. These can serve to lift the device above puddles and other environmental hazards that can occur at a placement site, and advantageously streamline installation by permitting the bird repelling device 400 to be installed by simply placing it on an appropriately sized and approximately level surface. The processor 440 can be in communication with a database containing audio files that encode for deterrent sounds. Examples of such audio files include, but are not limited to, pest species sounds, predator sounds, distress calls, human voices, hand claps, explosions, and/or gunfire. The processor 440 can be configured to retrieve such sound files from the database and transmit an audio signal to the sound emitter 430. It is contemplated that the processor 440 can retrieve a set of sound files, and that individual sound files can be selected from such a set for transmission to the sound emitter 430. Such sound files can be transmitted in a predetermined order and/or at predetermined intervals, or can be transmitted in a random or pseudorandom order and/or at random or pseudorandom intervals. The bird repelling device can include a light sensor 460 which provides a data stream to the processor 440. In some embodiments of the inventive concept the photovoltaic panel 420 or a portion thereof can be utilized as a light sensor. Such data can be used to determine if day or night conditions are present, and as such be utilized by the processor 440 to select day or night modes of operation for the bird repelling device. For example, volume of the repellent sounds can be decreased during night hours. Alternatively, different audio files or sets of audio files can be transmitted to the sound emitter during daylight and night hours. In still other embodiments the processor can be configured to power the bird repelling device off during night hours, advantageously conserving power.

A bird repelling device of the inventive concept can rely upon electricity derived from the photovoltaic panel 420 to power the device. Power produced by the photovoltaic panel 420 can be utilized to drive the bird repelling device 400 directly, or can be used to charge a battery, capacitor bank, and/or similar storage device for electrical energy. Such a bird repelling device can be essentially self-contained, advantageously permitting installation in a wide variety of locations that are not served by an AC power grid. Similarly, utilization of solar power reduces the need for maintenance (i.e. battery replacement) by the user. In some embodiments of the inventive concept, a bird repelling device can include a coupling or power cord that permits attachment to an AC power grid, which can serve to extend operating hours during periods of low ambient light.

As noted above, natural sounds such as distress calls of pest species and/or predator vocalizations are particularly effective in repelling avian pests. Examples of devices that use such sounds are the BXP-PRO 2 Peller Pro Electronic Bird Repeller and the GB Goose Buster Electronic Goose Repeller (Bird-X, Chicago, Ill.), which are stationary devices that utilize natural sounds to deter bird pests. It has also been found, however, that birds become habituated or accustomed to even these sound deterrents in a relatively short time. Once accustomed to the deterrent sounds birds return to the area that the user wishes to protect, greatly reducing the utility of conventional bird repelling devices that rely solely on such sounds. This habituation phenomena can be partially compensated for by utilizing a number of high powered speakers that are distributed throughout the area to be protected, however such an installation entails considerable expense and has high power requirements. This severely restricts the utility of such bird deterring devices in actual use, as suitable installation sites are limited, by necessity, to those having an AC mains installation within range of a power cord. The inventors contemplate that features of the bird repelling device 400 advantageously prevent such pest habituation by permitting the device to be easily and conveniently moved to any of a wide variety of locations within a protected area, greatly increasing the effectiveness of the deterrent stimuli without added expense. Towards this end, a bird repelling device of the inventive concept can be dimensioned to permit facile transport by an individual user of average height and fitness without assistance. For example, such a bird repelling device can have a maximum linear dimension of less than about 100 cm. Similarly, a bird repelling device of the inventive concept can have a mass of less than about 25 kg. In addition, relatively low power requirements can permit the use of a photovoltaic panel to supply the power needs of a device of the inventive concept. Being thus essentially self contained and requiring minimal maintenance permits use of a device of the inventive concept in a wide variety of field locations where AC mains are not accessible or would be prohibitively expensive to install.

FIG. 4B depicts an embodiment of a control panel that can be utilized by a bird repelling device 400. Such a user interface 450 can include a display 451 and one or more control switches/buttons 452. The display 451 can serve to display the status of the deterrent device, including, but not limited to, power supply status, time and/or date setting, times and/or dates the deterrent device was activated, signal strength and/or online connection status. Alternatively, the display can be utilized to provide the user with feedback for programming of the deterrent device, including, but not limited to, selection of deterrent sounds or sets of deterrent sounds, immediate or on-demand playing of one or more audio files and/or sets of deterrent sounds, selection of the content of sets of deterrent sounds, selection of volume, selection of hours of operation, and/or selection of the content of day and/or night operational modes. Such functions can be displayed as icons, in a menu format, and/or in a nested menu format. Functions thus displayed can be selected using a button or similar mechanism of the deterrent device. Utilizing such a display a user can, for example, select from a set of previously recorded sets of deterrent sounds, generate a new sets of deterrent sounds, or both. The display 451 can be a liquid crystal display, a TFT display, an LED display, and/or an OLED display. Similarly, control switches/buttons 452 can have functions that reflect the various functionalities of the deterrent device, including, but not limited to, on/off functions, a sleep mode function, date and/or time setting, volume, on demand play of sound files, a display and/or menu navigation function, and/or a menu item selection function. Suitable control buttons include, but not limited to, blister or membrane buttons, dome buttons, rocker switches, and/or dip switches. Alternatively, control buttons can be virtual buttons formed in a display. Such a display can be the user interface display screen 230 (or a portion thereof), a separate control display, or a combination of these. In still other embodiments of the inventive concept, a joystick or navigational pad can be utilized that permits both navigation of the display 451 and selection of display contents. In still other embodiments the display 451 can be touch-sensitive. The user interface 450 can include a protective cover 453, which can be transparent. Such a protective cover 453 can be affixed to the deterrent device using a hinge 454 or similar device. Alternatively, a protective cover 453 can be configured to slide over the display 451.

Figure 5:
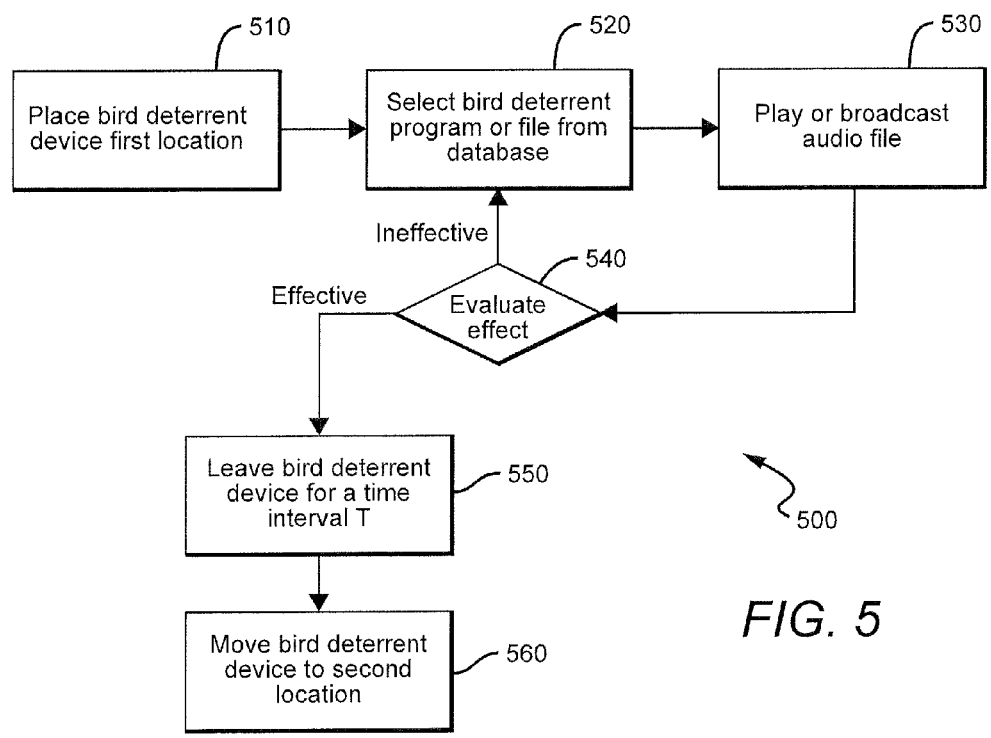
FIG. 5 is a flowchart depicting a method of deterring birds from an area containing a bird deterrent system.

Another embodiment of the inventive concept is a method for repelling birds using a portable bird repelling device, an example of which is depicted in FIG. 5. As depicted in the flowchart, utilizing such a method 500 a user can initially place a portable bird repelling device at a first location 510 within the area to be protected. The user can then utilize a selection process 520 to choose a bird deterrent program or audio file, for example, through the use of a user interface of the bird deterrent device as described above. The user can utilize a function of such a user interface implement (for example, by using an on demand playback process 530) to play or otherwise broadcast the contents of the audio file within the area to be protected, taking this opportunity to observe 540 what effect (if any) the selected deterrent sound or sound program can have on undesired birds in the vicinity. If the selected sound or sound program does not have the desired effect the selection process 520 and on demand playback process 530 can be repeated. On identifying an effective sound or sound program the bird repelling device can be left at this first location for a period of time T 550. The time period or interval T can be selected so as to reduce or eliminate habituation of the pest species to the presence of the bird deterrent device at this first location. Values for T can be determined from literature or other expert sources, or can be determined empirically. In some embodiment of the inventive concept T can be about 24 hours or less. In other embodiments of the inventive concept T can be between about 1 and about 7 days. In still other embodiments of the inventive concept T can be between about 5 and about 30 days. In yet other embodiments of the inventive concept T can be greater than about 30 days. Following the passage of the time interval T, the user can retrieve the bird repellent device and relocate it to a second, different position 560 within the area to be protected. It is contemplated that the distance between such first and second locations can be such that repositioning can be readily accomplished by an individual user of average height and fitness while carrying or holding a bird repelling device of the inventive concept without assistance (i.e. from, for example, a trailer, draft animal, motorized vehicle, and/or other mechanical device). For example, the distance between the first and second location within a protected area can between about 10 meters and about 100 meters. In some embodiments of the inventive concept the distance between the first and second locations within the protected area can be between about 1 meter and about 10 meters. In other embodiments of the inventive concept the distance between the first and second locations within the protected area can be less than about 1 meter.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A portable bird repelling device comprising:
   a sound emitter;
   a processor configured to utilize the sound emitter to emit different first and second deterrent sounds;
   a photovoltaic array that provides power to operate the sound emitter and the processor;
   a geo-location tool that obtains location information related to the portable bird repelling device, and wherein the processor is configured to use the location information to select the first and second deterrent sounds emitted by the sound emitter; and
   a receiver configured to receive a program signal from a remote control device.

2. The portable bird repelling device of claim 1, further comprising a set of audio files that can be rendered to produce the first and second deterrent sounds, and wherein the first and second deterrent sounds are pest species sounds.

3. The portable bird repelling device of claim 1, further comprising a set of audio files that can be rendered to produce the first and second deterrent sounds, and wherein the first and second deterrent sounds are predator species sounds.

4. The portable bird repelling device of claim 1, further comprising a sensor configured to detect an environmental condition and produce a sensor signal, and wherein the processor is configured to receive the sensor signal and control when at least one of the deterrent sounds is used based on the sensor signal.

5. The portable bird repelling device of claim 4, wherein the sensor comprises a light sensor.

6. The portable bird repelling device of claim 4, wherein the sensor comprises a temperature sensor.

7. The portable bird repelling device of claim 4, wherein the sensor comprises a motion sensor.

8. The portable bird repelling device of claim 4, wherein the sensor comprises a sound sensor.

9. The portable bird repelling device of claim 1, further comprising a light sensor configured to (1) detect at least one of a light and a change in brightness and (2) produce a light sensor signal, and wherein the processor is configured to receive the light sensor signal and control when at least one of the deterrent sounds is used based on the light sensor signal.

10. The portable bird repelling device of claim 1, further comprising a user interface operatively coupled with the processor and configured to allow a user to control when at least one of the deterrent sounds is used.

11. The portable bird repelling device of claim 10, wherein the user interface is configured to allow a user to set timer parameters for emitting at least one of the deterrent sounds.

12. The portable bird repelling device of claim 10, wherein the user interface is configured to allow a user to select which of the deterrent sounds is to be employed.

13. The portable bird repelling device of claim 1, wherein the device is configured to be powered on sunny days entirely by the photovoltaic array for a period of at least five consecutive hours.

14. The portable bird repelling device of claim 1, further comprising a power storage device, wherein the portable bird repelling device is configured to be powered on sunny days entirely by the photovoltaic array and the power storage device, for a period of at least five consecutive hours for each of at least 30 consecutive days.

15. The portable bird repelling device of claim 1, wherein the device is configured to be operated without any external hard-wired power source.

16. The portable bird repelling device of claim 1, further comprising a motion sensor configured to (1) detect a movement and (2) produce a motion sensor signal, and wherein the processor is configured to receive the sensor signal and control when at least one of the deterrent sounds is used based on the motion sensor signal.

* * * * *